(12) United States Patent
Ra et al.

(10) Patent No.: US 10,015,831 B2
(45) Date of Patent: *Jul. 3, 2018

(54) MULTIPLE NETWORK CONNECTION METHOD AND COMMUNICATION DEVICE THEREOF

(71) Applicant: LG Electronics Inc., Seoul (KR)

(72) Inventors: Mi-Seon Ra, Seoul (KR); Jae-Seung Song, Seoul (KR); Kyung-Ae Yoon, Suwon (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,392

(22) Filed: Jun. 23, 2014

(65) Prior Publication Data
US 2014/0302848 A1    Oct. 9, 2014

Related U.S. Application Data (63) Continuation of application No. 14/035,496, filed on Sep. 24, 2013, now Pat. No. 8,787,298, which is a
(Continued)

(30) Foreign Application Priority Data

Sep. 12, 2006   (KR) .................... 10-2006-0088272

(51) Int. Cl.
*H04W 76/00* (2018.01)
*H04L 29/06* (2006.01)
(Continued)

(52) U.S. Cl.
CPC ....... *H04W 76/025* (2013.01); *H04L 63/0853* (2013.01); *H04W 12/06* (2013.01);
(Continued)

(58) Field of Classification Search
None
See application file for complete search history.

(56) References Cited

U.S. PATENT DOCUMENTS 7,251,488 B2   7/2007 Chitrapu
8,126,477 B2   2/2012 Dravida et al.
(Continued)

FOREIGN PATENT DOCUMENTS

KR   10-2002-0068167 A   8/2002
WO   WO 2005/043826 A1   5/2005

OTHER PUBLICATIONS

3rd Generation Partnership Project (3GPP); "3rd Generation Partnership Project (3GPP); Technical Specification Group Core Network; IP Multimedia (IM) session handling; IM call model; Stage 2"; 3GPP TS 23.218 v7.0.0, Dec. 2005, 57 pages.
(Continued)

*Primary Examiner* — Suk Jin Kang
(74) *Attorney, Agent, or Firm* — Birch, Stewart, Kolasch & Birch, LLP (57) ABSTRACT

A multiple network connection method that includes: receiving, by a first device from a second device, capability information of the second device; transmitting, by the first device to the second device, a registration complete message indicating that the second device is registered to a network; and performing, by the first device, a service control for providing a service for the second device. A first connection path and a second connection path are established using the capability information. The first connection path is established between the network and the second device through the first device, and is used for conveying control information for the service. The second connection path is estab-
(Continued)

lished between the network and the second device not through the first device, and is used for conveying user data for the service.

8 Claims, 6 Drawing Sheets

Related U.S. Application Data continuation of application No. 12/162,295, filed as application No. PCT/KR2007/000341 on Jan. 19, 2007, now Pat. No. 8,649,332.

(60) Provisional application No. 60/765,217, filed on Feb. 6, 2006.

(51) Int. Cl.
   H04W 12/06    (2009.01)
   H04W 48/02    (2009.01)
   H04W 92/02    (2009.01)
   H04W 76/22    (2018.01)
   H04W 76/14    (2018.01)
   H04W 76/15    (2018.01)
   H04W 84/18    (2009.01)
   H04W 84/20    (2009.01)
   H04W 76/02    (2009.01)
   H04W 48/18    (2009.01)

(52) U.S. Cl.
   CPC .......... *H04W 48/18* (2013.01); *H04W 76/14* (2018.02); *H04W 76/15* (2018.02); *H04W 76/22* (2018.02); *H04W 92/02* (2013.01); *H04W 84/18* (2013.01); *H04W 84/20* (2013.01)

(56) References Cited

U.S. PATENT DOCUMENTS

| | | |
|---|---|---|
| 2002/0085516 A1 | 7/2002 | Bridgelall |
| 2004/0066769 A1 | 4/2004 | Ahmavaara et al. |
| 2004/0077374 A1 | 4/2004 | Terry |
| 2004/0180657 A1 | 9/2004 | Yaqub et al. |
| 2005/0041578 A1* | 2/2005 | Huotari .................. H04W 4/00 370/229 |
| 2005/0078824 A1 | 4/2005 | Malinen et al. |
| 2005/0080884 A1 | 4/2005 | Siorpaes et al. |
| 2005/0083899 A1 | 4/2005 | Babbar et al. |
| 2005/0165916 A1 | 7/2005 | Cromer et al. |
| 2005/0286466 A1 | 12/2005 | Tagg et al. |
| 2006/0293028 A1 | 12/2006 | Gadamsetty et al. |
| 2007/0010261 A1 | 1/2007 | Dravida et al. |
| 2007/0014281 A1 | 1/2007 | Kant |
| 2007/0076649 A1* | 4/2007 | Lin ..................... H04W 76/025 370/328 |
| 2007/0091845 A1* | 4/2007 | Brideglall ............ H04W 36/04 370/331 |
| 2007/0094691 A1 | 4/2007 | Gazdzinski |
| 2007/0110075 A1 | 5/2007 | Olvera-Hernandez |
| 2007/0143613 A1 | 6/2007 | Sitch et al. |
| 2007/0165612 A1 | 7/2007 | Buckley |
| 2007/0217354 A1 | 9/2007 | Buckley |
| 2007/0238466 A1 | 10/2007 | Buckley et al. |
| 2007/0238467 A1 | 10/2007 | Buckley et al. |
| 2007/0238468 A1 | 10/2007 | Buckley et al. |
| 2007/0274289 A1 | 11/2007 | Buckley et al. |
| 2008/0037483 A1 | 2/2008 | Ali et al. |
| 2008/0192733 A1* | 8/2008 | Song ................... H04L 65/1016 370/352 |
| 2008/0318565 A1* | 12/2008 | Stojanovski ...... H04W 36/0022 455/422.1 |
| 2009/0054104 A1 | 2/2009 | Borean et al. |
| 2009/0168701 A1 | 7/2009 | White et al. |
| 2010/0034166 A1 | 2/2010 | Olvera-Hernandez |

OTHER PUBLICATIONS

3rd Generation Partnership Project (3GPP); "3rd Generation Partnership Project (3GPP); Technical Specification Group Services and System Aspects; Voice Call Continuity between CS and IMS Study"; 3GPP TR 23.806 v7.0.0, Dec. 2005, 153 pages.

3rd Generation Partnership Project (3GPP); "3rd Generation Partnership Project (3GPP); Technical Specification Group Terminals; SIM/USIM internal and external interworking aspects"; 3GPP TR 31.900 v6.1.0, Mar. 2005, 39 pages.

Eric Hsiao-Kuang Wu; Yi-Zhan Huang, Jui-Hao Chiang; "Dynamic adaptive routing for heterogeneous wirelesss network", Global Telecommunications Conference, 2001, GLOBECOM '01. IEEE, vol. 6, Nov. 25-29, 2001, pp. 3608-3612.

* cited by examiner

MULTIPLE NETWORK CONNECTION METHOD AND COMMUNICATION DEVICE THEREOF

CROSS REFERENCE TO RELATED APPLICATIONS

This application is a continuation of co-pending U.S. application Ser. No. 14/035,496 filed on Sep. 24, 2013, which is a continuation of U.S. application Ser. No. 12/162,295, filed on Jul. 25, 2008 (now U.S. Pat. No. 8,649,332) which is the National Stage of PCT Application No. PCT/KR2007/000341 filed on Jan. 19, 2007, which claims priority to Korean Application No. 10-2006-0088272 filed in Korea on Sep. 12, 2006, as well as to U.S. Provisional Application No. 60/765,217 filed Feb. 6, 2006. The entire contents of all these applications are hereby incorporated by reference as fully set forth herein in their entirety.

BACKGROUND OF THE INVENTION

Field of the Invention

The present invention relates to a multiple network connection method, and a communication device thereof, and more particularly, to a multiple network connection method capable of enabling a first communication device connectable to a first communication network to implement a service that can be provided from the first communication network through a second terminal connectable to a second communication network.

Discussion of the Related Art

Generally, a personal area network (PAN) represents a network contrary to the well-known LAN or WAN, which means that each person is provided with his own network. That is, a person implements his own network for convenience by using his portable terminal, etc.

The conventional PAN will be explained with reference to FIG. 1.

Figure 1:
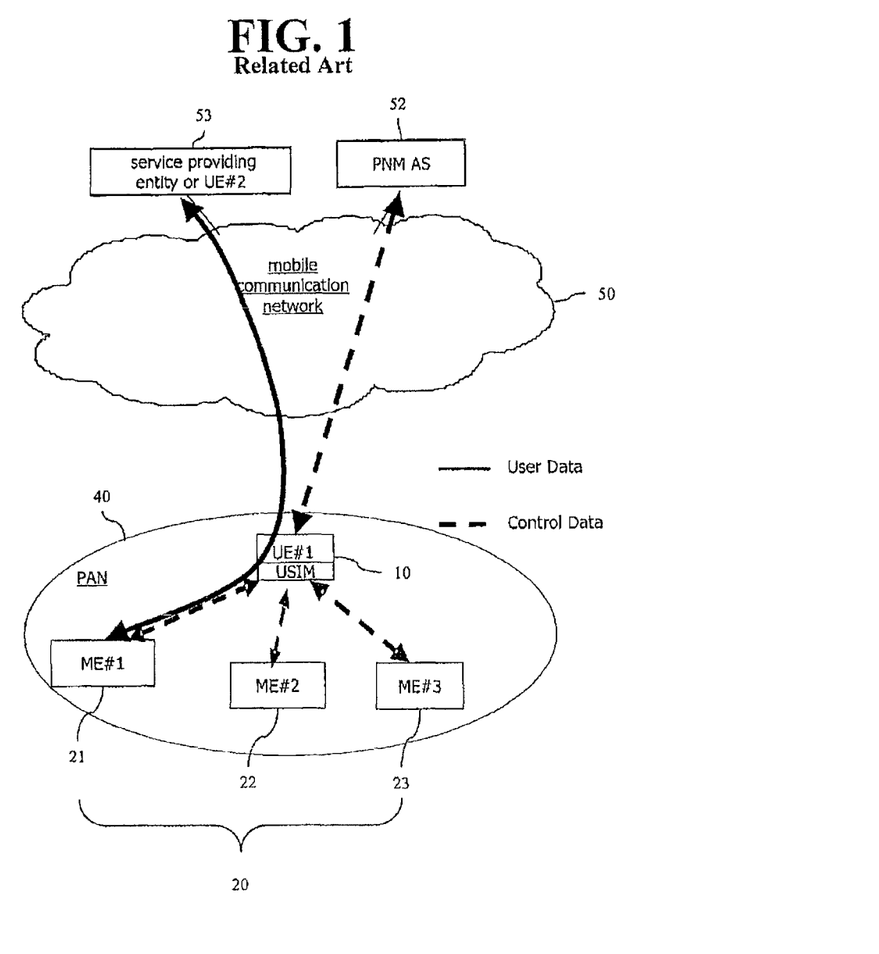
FIG. 1 is an exemplary view showing a personal area network (PAN) in accordance with the conventional art.

FIG. 1 is an exemplary view showing a personal area network (PAN) in accordance with the conventional art.

Referring to FIG. 1, the PAN comprises a user equipment (UE) 10, and mobile equipment (ME) 21 to 23.

The UE 10 has a first module (not shown) connectable to a mobile communication network 50, and is provided with various communication service from a service providing entity 53 inside the mobile communication network 50 or executes a communication with a UE#2 53.

The UE 10 has a subscriber identity module (SIM) or a universal subscriber identity module (USIM), through which an authentication process and various communication services are executed.

The UE 10 may be provided with a communication module such as an infrared ray communication, and constitutes a PAN 40 through the communication module.

The ME 20 is a mobile communication device or a fixed communication device, and is provided with a communication module (not shown) for supporting a short distance communication such as an infrared ray communication. The ME 20 can participate in the PAN 40 through the communication module.

The ME 20 may communicate with the service providing entity 53 or the UE#2 53 inside the mobile communication network 50 through the UE 10. Herein, a PNM application server (PNM AS) 52 controls the communication.

The UE 10 and the ME 20 of FIG. 1 may constitute one PAN 40, and may transceive data inside the PAN 40. The ME 20 may transceive data with the service providing entity 53 or the UE#2 53 inside the mobile communication network 50 through the UE 10.

That is, the ME 20 inside the PAN 40 can transceive data with the mobile communication network 50 through the UE 10.

SUMMARY OF THE INVENTION

In the aforementioned method, the ME 20 has to execute a service provided from the mobile communication network 50 through the UE 10.

That is, in order for the ME 20 inside the PAN 40 to execute a service provided from the mobile communication network 50, it has to pass through the UE 10. However, executing the service through the UE 10 has the following problems.

First, since the ME 20 executes the same service as the UE 10 through the UE 10, each battery of the UE 10 and the ME 20 is consumed.

Second, even if the ME 20 executes the same service as the UE 10 through the UE 10, it is dependent on a communication environment of the UE 10.

Third, since data of the ME 20 is concentrated on the UE 10, a function of the UE10 may be degraded.

Fourth, since data of the ME 20 is concentrated on the UE 10, the UE10 may cause a communication overload.

Therefore, it is an object of the present invention to provide a multiple network connection method capable of transceiving control data for controlling a second terminal (ME) through a first communication device (UE), and capable of transceiving general data through a new connection path to which the second terminal (ME) is connectable.

To achieve these objects, there is provided a multiple network connection method through a first communication device comprised in a multiple network comprising one or more second communication device, the method comprising: transmitting a service request message to the second communication device by the first communication device; transmitting a response message including service connection information to the first communication device by the second communication device; transmitting the service request message including the service connection information to a network management server by the first communication device; transmitting a request message to set a new connection path with the second communication device to a service providing entity or an external communication device by the network management server; and generating a new connection path between the service providing entity or the external communication device and the second communication device, and transceiving data through the new connection path.

Preferably, the service may be provided to the first communication device with fee.

Preferably, the first communication device may have an authorization to access to the service, and may be provided with a SIM or a USIM.

Preferably, the service request message may include at least one of IP address information and port number of the second communication device.

Preferably, the service connection information may include at least one of information about IP address and information about a port number.

Preferably, the network management server is a personal network management (PNM) server.

Preferably, the service request message may include at least one of a network ID of the first communication device, a network ID of the second communication device, an IP address of the second communication device, a port number of the second communication device, and a service ID. Preferably, the new connection path may be a path, between the service providing entity and the second communication device, through another access network not through the first communication device.

According to another aspect of the present invention, a multiple network connection method through a first communication device comprised in a multiple network comprising one or more second communication device, the method comprises: transmitting a service request message to the second communication device by the first communication device when receiving the service request message from a service providing entity or an external communication device through a network management server; transmitting a response message including the service connection information to the network management server by the first communication device; transmitting the response message including the service connection information to the service providing entity or the external communication device by the network management server; and generating a new connection path between the service providing entity or the external communication device and the second communication device, and transceiving data through the new connection path.

Preferably, the service request message may include an indicator to instruct any second communication device to perform a service.

Preferably, the service request message may include an ID of the second communication device.

Preferably, the service request message may include a service ID representing that the service request message is for a PAN service.

To achieve these objects, there is also provided a communication device that participates in a network formed by a master communication device connectable to an external communication network, the communication device capable of transmitting a response message including service connection information to the master communication device if a service request message is received from the master communication device, capable of generating a new connection path with a service providing entity or an external communication device, and then capable of transceiving data through the new connection path to/from the service providing entity or the external communication device.

According to another aspect of the present invention, there is provided a communication device that is a first communication device comprised in a multiple network comprising one or more second communication devices, the communication device capable of delivering a service request message to a target communication device among the one or more second communication devices in the multiple network if the service request message is received from a service providing entity or an external communication device through a network management server, capable of receiving a response message including service connection information from the target communication device, and capable of transmitting connection setting information to generate a new connection path between the target communication device and the service providing entity or the external communication device to the network management server.

DETAILED DESCRIPTION OF THE INVENTION

Reference will now be made in detail to the preferred embodiments of the present invention, examples of which are illustrated in the accompanying drawings.

A multiple network connection method and a communication device thereof according to the present invention will be explained in more detail.

Figure 2:
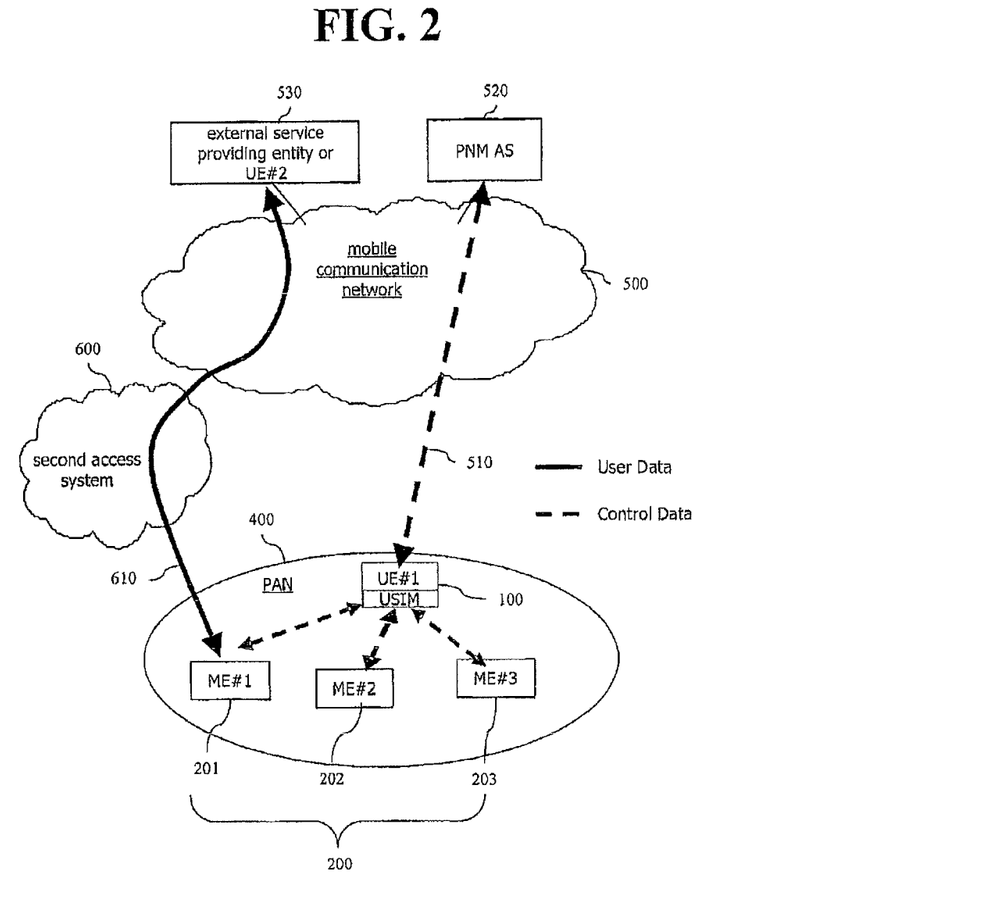
FIG. 2 is an exemplary view showing a personal area network (PAN) according to the present invention.

FIG. 2 is an exemplary view showing a personal area network (PAN) according to the present invention.

Referring to FIG. 2, a personal area network (PAN) 400 transceives control data through a UE 100 (a first communication device or a master communication device), and transceives service data through a new connection path 610 to which a ME 200 (a second communication device) can access, thereby performing a service provided from a mobile communication network 500 through the ME 200.

The PAN 400 may comprise the UE 100 and at least one ME 200.

The UE 100 is a communication device including a first communication module (not shown) for supporting a standard such as CDMA, TD-SCDMA, TDMA, GPRS, EDGE, and WCDMA. The UE 100 accesses to the mobile communication network 500 through the first communication module, thereby performing various communication services. The UE 100 includes a subscriber identity module (SIM) or a universal subscriber identity module (USIM), through which an authentication process and various communication services are performed.

In order to directly communicate with the ME 200, the UE 100 may includes a second communication module (not shown) for supporting a wireless connection such as infrared ray communication, the Bluetooth™, the Zigbee, and the wireless universal serial bus (USB), or a wire local network connection. The UE 100 may participate in the PAN 400 by the second communication module.

The UE 100 may communicate with a personal network management (PNM) so as to manage the PAN 400. The UE 100 may also communicate with a PNM application server (PNM AS) or a network management server 520 so that the ME 200 can communicate with an external service providing entity 530 or a UE#2 530 connected to the mobile communication network 500.

The ME 200 (the second communication device) is a mobile communication device or a fixed communication device, and includes a first communication module (not shown) for supporting a wireless connection such as infrared ray communication, the Bluetooth™, the Zigbee, and the wireless universal serial bus (USB), or supporting one or more standards of IEEE 802.3, IEEE 802.11, IEEE 802. 16 and IEEE 802. 20. The ME 200 may participate in the PAN 400 by the first communication module.

The ME 200 may communicate with the external service providing entity 530 or the UE#2 530 connected to the mobile communication network 500 by transceiving control data to/from the PNM AS 520 through the UE 100, and by transceiving service data to/from the external service providing entity 530 or the UE#2 530 through a new connection path 610 via a second access system 600 (or a second access network). The new connection path 610 indicates a connection path between the ME#1 201 and the external service providing entity 530 or the UE#2 530, which is different from the conventional connection path between the UE#1 100 and the external service providing entity 530 or the UE#2 530. The new connection path 610 may be an Internet protocol (IP)-based connection path.

So far, the construction of the PAN 400 according to the present invention was explained.

Hereinafter, the operation of terminals inside the PAN 400 will be explained.

Figure 3:
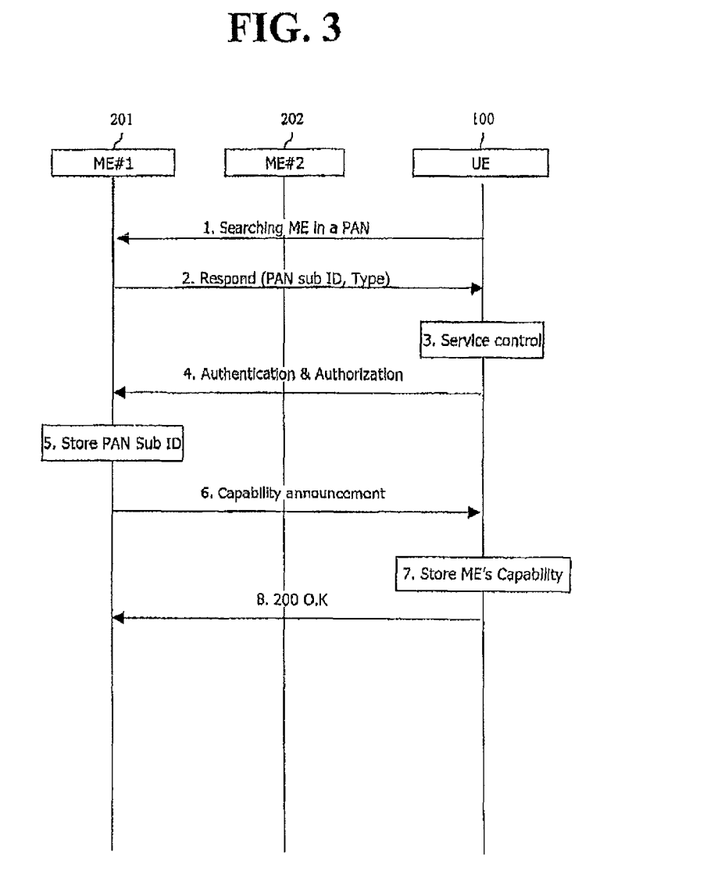
FIG. 3 is an exemplary view showing a reciprocal recognition process between terminals of FIG. 2.

FIG. 3 is an exemplary view showing a reciprocal recognition process between terminals of FIG. 2.

Referring to FIG. 3, the UE 100 registers the ME#1 201 to the PAN 400. Herein, the UE 100 is supposed to have a USIM.

(1) The UE 100 having a USIM performs a search (or, a scan) to recognize the ME#1 201 usable in the PAN 400.

(2) The ME#1 201 responses to the search. As the response, the ME#1 201 may transmit a response message to the UE 100. If the ME#1 201 is not registered in the PAN 400, the ME#1 201 may transmit information for making its presence recognized to the UE 100. The information may be included in the response message. That is, the response message may include an ID and a type of the ME#1 201 required for informing a presence of the ME#1 201. For instance, the response message may include information of PAN Sub ID=None and Type=PC.

(3) The UE 100 performs a service control in response to receiving the response message. More concretely, the UE 100 checks the ID of the ME#1 201 (for example the PAN Sub ID of the ME#1 201). Then, if the ME#1 has no ID, the UE 100 generates a new ID (for example a new PAN Sub ID) and stores it.

(4) The UE 100 performs authentication and authorization processes after recognizing the ME#1 201. For instance, the UE 100 transmits an authentication/authorization message to the ME#1 201. The generated ID (for example, PAN Sub ID) may be transmitted to the ME#1 together with the authentication and authorization message.

(5) The ME#1 201 stores the ID (for example, the PAN Sub ID) received from the UE 100.

(6) The ME#1 201 informs its capability and usable resources to the UE 100. The capability and usable resources may be a codec, a screen size, and a network type. The capability and the usable resources may be informed by transmitting a capability informing message such as a capability announcement message.

(7) The UE 100 stores the capability and usable resources. The stored capability and usable resources of the ME#1 201 may be transmitted to the PNM AS 520 if necessary. The stored capability and usable resources may be updated when the UE 100 receives changed information from the ME#1 201.

(8) The UE 100 informs a recognition completion to the ME 200. The recognition completion may be informed by transmitting a positive response message such as an OK message to the ME 200. If the ME#1 201 is aware of a success of the recognition, it waits as an idle state until a communication starts.

A process for the UE 100 to select the ME#1 201 so as to perform a specific service through the ME#1 201 will be explained with reference to FIG. 4.

Figure 4:
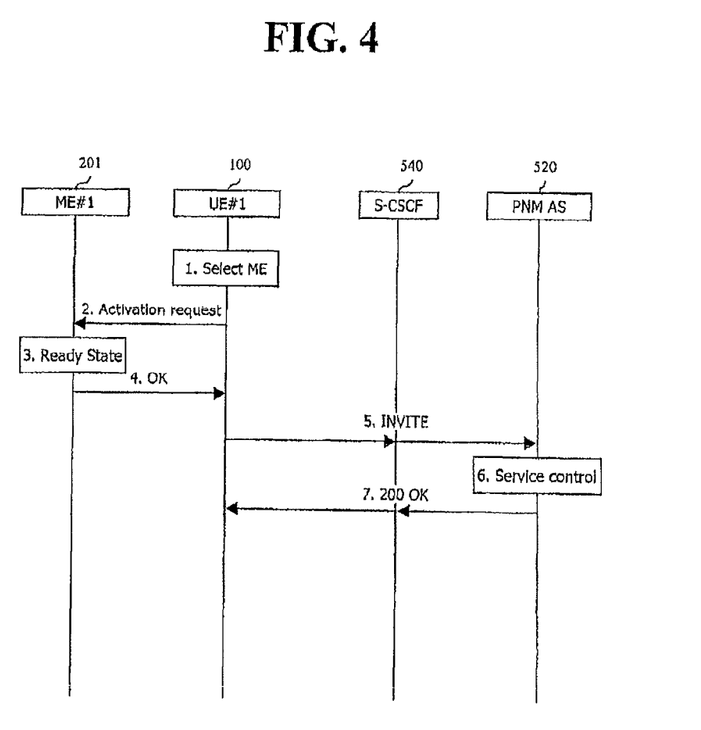
FIG. 4 is an exemplary view showing a registration process of the terminals of FIG. 2.

FIG. 4 is an exemplary view showing a registration process of the terminals of FIG. 2.

Referring to FIG. 4, after the completion of the recognition in FIG. 3, the UE 100 selects the ME#1 201 so as to perform a specific service through the ME#1 201, and registers the ME#1 201 to the application server (AS) 520 in the mobile communication network 500.

(1) When the UE 100 is to receive a specific service such as a media service through a specific terminal inside the PAN 400, it selects the ME#1 201 being recognized in the PAN 400.

(2) The UE 100 requests an activation to the ME#1 201 so as to receive the specific service through the ME#1 201. The request of the activation may be achieved by transmitting an activation request message to the ME 200. The activation request message may be processed according to a mechanism of an access system inside the PAN 400.

(3) The ME#1 201 is converted into a ready state so as to perform the specific service in response to the activation request.

(4) The ME#1 201 responses to the UE 100 by transmitting a response message such as an OK message to the UE 100. The ME#1 201 waits to receive the specific message.

(5) The UE 100 requests the PNM AS 520 inside the mobile communication network 500 to change a destination for data transfer. The request of the change is achieved by transmitting a change request message to the PNM AS 520. The change request message may be an INVITE message, and may include one or more of a PAN ID of the UE 100, a PAN ID (SUB ID) of the ME#1 201, an address of the ME#1 201 (IP address), a port number of the ME#1 201, and an ID of the specific service.

The change request message may be transparently transmitted to the PNM AS 520 through a serving-call state control function (S-CSCF) 540 inside the mobile communication network 500. The S-CSCF 540 is an entity to route the change request message to the PNM AS 520, and performs a session routing in an IP multimedia subsystem (IMS). The S-CSCF 540 is well known to those skilled in the art, and thus its detail explanation will be omitted.

(6) The PNM AS 520 performs a service control. That is, the PNM AS 520 changes a destination for transfer of the specific service data into the ME 200 by using information received from the UE 100.

(7) The PNM AS 520 informs a completion of the change to the UE 100 by transmitting a positive response message such as an OK message.

Figure 5:
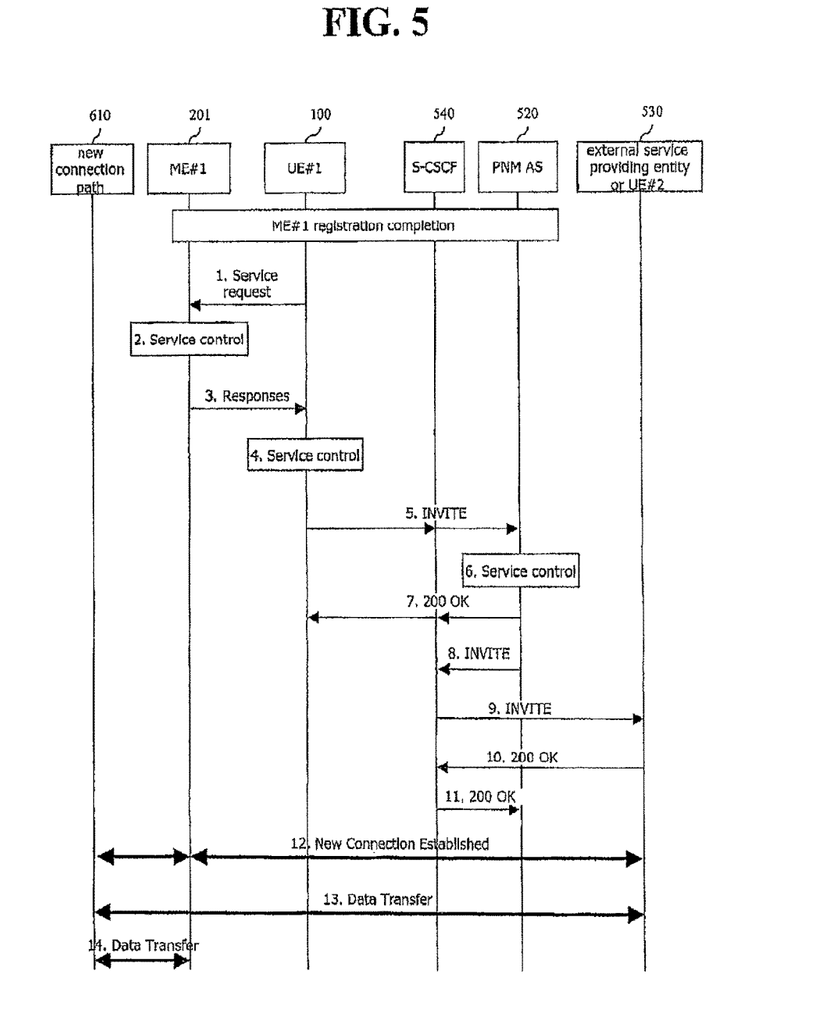
FIG. 5 is an exemplary view showing a multiple network connection method according to one embodiment of the present invention.

FIG. 5 is an exemplary view showing a multiple network connection method according to one embodiment of the present invention.

Referring to FIG. 5, in the multiple network connection method, the UE#1 100 performs a specific service provided from the external service providing entity 530 or the UE#2 530 through the ME#1 201. Herein, it is supposed that the ME#1 201 is included in the PAN 400 in FIG. 3, and is registered to the PNM AS 520 in FIG. 4.

(1) The UE#1 100 requests a service from the ME#1 201 so as to perform a specific service or a specific service to be perform through the ME#1 201. The request of the service may be achieved by transmitting a service request message to the ME#1 201 by the UE#1 100. The service request message may include a query message for an address of the ME#1 201 (e.g., IP address) and a port number.

(2) The ME#1 201 performs a service control in response to the service request. More concretely, the ME#1 201 checks whether or not the service can be performed. That is, the ME#1 201 activates its second communication module by the service control. Then, the ME#1 201 obtains necessary information such as an address and a port number.

(3) The ME#1 201 transmits a response message to the UE#1 100. The response message may include service connection information such as the obtained information.

(4) The UE#1 100 performs a service control. More concretely, the UE#1 100 updates the service connection information obtained by the received response message, i.e. information of the ME#1 201 that has been pre-stored therein (e.g., an ID of the PAN 400), information of the specific service, etc.

(5) The UE#1 100 requests a service from the PNM AS 520 by transmitting a service request message such as an INVITE message to the PNM AS 520. Herein, the service request message is transparently transmitted to the PNM AS 520 through the S-CSCF 540. The service request message may include one or more of service connection information, i.e., a PAN ID of the UE#1 100, a PAN ID (Sub ID) of the ME#1 201, an address (IP address) of the ME#1 201, a port number of the ME#1 201, and an ID of the specific service.

(6) The PNM AS 520 performs a service control in response to the service request. More concretely, the PNM AS 520 performs a service control, stores the service connection information, recognizes that service data is transceived through a new connection path 610, and prepares a fee charging.

(7) When the setting is completed, the PNM AS 520 transmits a positive response message to the UE#1 100. Herein, the positive response message is transparently transmitted to the UE#1 100 through the S-CSCF 540.

(8) The PNM AS 520 requests a service to the S-CSCF 540 by transmitting a service request message such as an INVITE message.

(9) The S-CSCF 540 routes the request of the service to an external service providing entity 530 or an UE#2 530.

(10) The external service providing entity 530 or the UE#2 530 transmits a positive or negative response message to the S-CSCF 540 in response to the service request. Herein, the positive response message may be a 200 OK message.

(11) The S-SCCF 540 transmits the positive or negative response message to the PNM AS 520.

(12) The external service providing entity 530 or the UE#2 530 generates a new connection path 610 to the ME#1 201.

(13-14) The external service providing entity 530 or the UE#2 530 transmits service data to the ME#1 201 through the new connection path 610.

Figure 6:
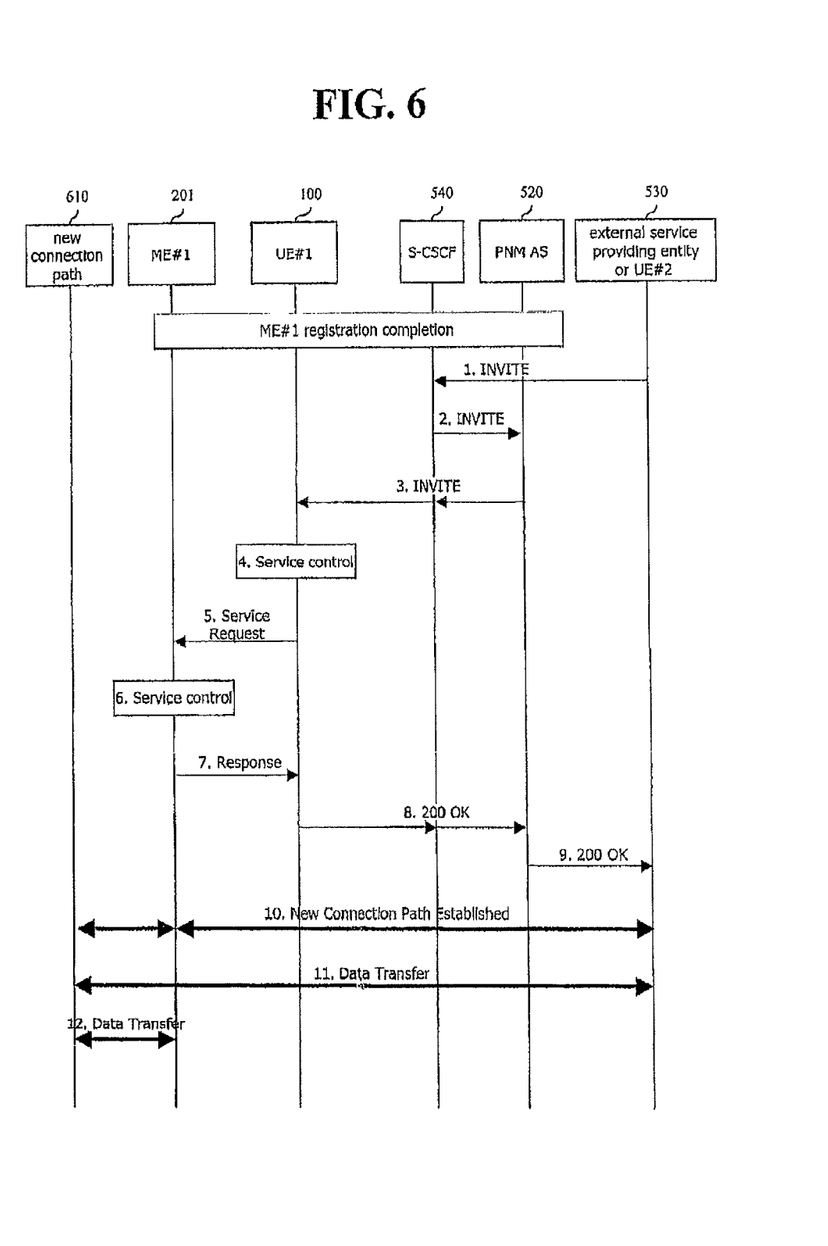
FIG. 6 is an exemplary view showing a multiple network connection method according to another embodiment of the present invention.

FIG. 6 is an exemplary view showing a multiple network connection method according to another embodiment of the present invention.

Referring to FIG. 6, in the multiple network connection method, a service is performed by a request of the external service providing entity 530. Once the UE 100 receives a service request from the external service providing entity 530, the ME#1 201 performs the service through the new connection path 610. Herein, it is supposed that the ME#1 201 is included in the PAN 400 in FIG. 3, and is registered to the PNM AS 520 in FIG. 4.

(1) The external service providing entity 530 requests a service to the S-CSCF 540 by transmitting a service request message such as an INVITE message. Herein, the service request message may include an indicator to indicate that a service is to be performed through any terminal, e.g., an ID (PAN ID) of the ME#1 201. The service request message may include a service ID to indicate a PAN service, e.g., Service ID=PNM.

(2) The S-CSCF 540 routes the request of the service to the PNM AS 520.

(3) The PNM AS 520 re-transmits the request of the service to the S-CSCF 540, and the S-CSCF 540 routes the request of the service to the UE 100.

(4) The UE 100 performs a service control in response to the request of the service. More concretely, the UE 100 performs the service control, thereby analyzing one or more of a capability of the ME#1 201, usable resources of the ME#1 201, and whether or not the service is usable.

(5) The UE 100 requests a service to the ME#1 201 after performing the service control. The request of the service is achieved by transmitting a service request message to the ME#1 201. The service request message may be one or more of a capability of the ME#1 201, usable resources of the ME#1 201, and whether or not the service is usable.

(6) The ME#1 201 performs a service control in response to the service request. More concretely, the ME#1 201 checks one or more of its capability, its usable resources, and whether or not the service is usable. That is, the ME#1 201 can check its PAN ID (SUB ID), its address (IP address), and its port number.

(7) The ME#1 201 transmits a response message to the UE 100. The response message may include 'service connection information' such as a capability of the ME#1 201, usable resources of the ME#1 201, and whether or not the service is usable. The 'service connection information' may include one or more of an ID of the ME#1 201 (PAN ID), an address of the ME#1 201 (IP address), and a port number of the ME#1 201.

(8) The UE 100 transmits a positive response message or a negative response message to the PNM AS 520 according to the response message of the ME#1 201. Herein, the positive response message may be a 200 OK message. As aforementioned, the positive or negative response message is transparently transmitted to the PNM AS 520 through the S-CSCF 540.

(9) The PNM AS 520 transfers the positive response message or the negative response message to the external service providing entity 530.

(10) The external service providing entity 530 or the UE#2 530 generates a new connection path 610 when receiving the positive response message. However, the external service providing entity 530 or the UE#2 530 transmits a failure message to the UE 100 when receiving the negative response message.

(11-12) The external service providing entity 530 transmits the service data through the new connection path 610.

Effects of the present invention will be explained as follows.

In the present invention, the ME 200 transceives data through the new connection path 610, which solves the conventional problem occurred when data is transceived through the UE 100 inside the PAN 400 with a concentration state.

First, since the ME 200 transceives data through the new connection path 610, a battery of the UE 100 is prevented from being unnecessarily consumed.

Second, since the ME 200 does not execute a service through the UE 100, it is not dependent on a communication environment of the UE 100.

Third, since the ME 200 does not execute a service through the UE 100, it does not degrade a capability of the UE 100.

Fourth, since the ME 200 does not execute a service through the UE 100, a communication overload of the UE 100 does not occur.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for a first device having multiple connection paths for performing services, the method comprising:
   receiving, by the first device from a second device, an activation request message according to an access system inside a personal area network, when the first device has received information associated with a recognition completion for the personal area network, wherein the second device is a user equipment including a subscriber identification module;
   receiving, by the first device from the second device via a first connection path, control information for a media service being provided by a service provider entity of an access network, when the first device is converted into a ready state to perform the media service;
   receiving, by the first device from the service provider entity via a second connection path, data of the media service, based on capability information of the first device, according to the control information which is received via the first connection path; and
   performing, by the first device, a service procedure corresponding to the data of the media service, according to a command message of the second device,
   wherein the first connection path includes a connection path between the first device and the second device within the personal area network,
   wherein the personal area network is established by a recognition process between the first device and the second device, and the personal area network provides direct wireless communication between the first device and the second device within the personal area network, and
   wherein the second connection path is a connection path between the first device and the access network without passing through the second device.

2. The method according to claim 1, wherein the second connection path is based on an Internet Protocol.

3. The method according to claim 1, wherein the first connection path includes the connection path between the first device and the second device and a connection path between the second device and the access network such that the first connection path is established between the first device and the access network through the second device, and wherein the first device receives the control information through the second device from the access network.

4. The method according to claim 1, wherein the second device is wirelessly connected to an access network using a first wireless communication technology, and the personal area network provides the direct wireless communication between the first device and the second device using a second wireless communication technology different from the first wireless communication technology.

5. A first device having multiple connection paths for performing services, the first device comprising:
   a first communication module;
   a second communication module; and
   a processor configured to:
      control the first communication module to receive, from a second device, an activation request message according to an access system inside a personal area network, when the first device has received information associated with a recognition completion for the personal area network, wherein the second device is a user equipment including a subscriber identification module,
      control the first communication module to receive, from the second device via a first connection path, control information for a media service being provided by a service provider entity of an access network, when the first device is converted into a ready state to perform the media service,
      control the second communication module to receive, from the service provider entity via a second connection path, data of the media service, based on capability information of the first device according to the control information which is received via the first connection path, and
      perform a service procedure corresponding to the data of the media service, according to a command message of the second device,
   wherein the first connection path includes a connection path between the first device and the second device within the personal area network,
   wherein the personal area network is established by a recognition process between the first device and the second device, and personal area network provides direct wireless communication between the first device and the second device within the personal area network, and
   wherein the second connection path is a connection path between the first device and the access network without passing through the second device.

6. The first device according to claim 5, wherein the second connection path is based on an Internet Protocol.

7. The first device according to claim 5, wherein the first connection path includes the connection path between the first device and the second device and a connection path between the second device and the access network such that the first connection path is established between the first device and the access network through the second device, and wherein the first device receives the control information through the second device from the access network.

8. The first device according to claim 5, wherein the second device is wirelessly connected to an access network using a first wireless communication technology, and the personal area network provides the direct wireless communication between the first device and the second device using a second wireless communication technology different from the first wireless communication technology.

* * * * *